United States Patent [19]
Murao et al.

[11] Patent Number: 4,810,076
[45] Date of Patent: Mar. 7, 1989

[54] SELECTIVE SHADING DEVICE AND AN OPTICAL DEVICE USING THE SAME

[75] Inventors: Tsugio Murao, Habikino; Yoshiharu Yamamoto, Toyonaka; Kenichi Ikeda, Takatsuki; Yoshitomi Nagaoka, Neyagawa; Yasuo Nakajima, Ibaraki, all of Japan

[73] Assignee: Matsushita Electric Industrial Co. Ltd., Osaka, Japan

[21] Appl. No.: 866,585

[22] Filed: May 23, 1986

[30] Foreign Application Priority Data

May 31, 1985 [JP] Japan ................................. 60-118328
Dec. 13, 1985 [JP] Japan ................................. 60-281347
Dec. 13, 1985 [JP] Japan ................................. 60-281352

[51] Int. Cl.$^4$ ............................................. G02B 26/02
[52] U.S. Cl. ...................................... 350/448; 350/266
[58] Field of Search ............... 350/252, 266, 268, 276, 350/276 R, 448, 449, 450, 451, 452, 578, 580

[56] References Cited

U.S. PATENT DOCUMENTS 531,994 1/1895 Gathmann ......................... 350/451

FOREIGN PATENT DOCUMENTS 1491064 11/1977 United Kingdom ................ 350/451

OTHER PUBLICATIONS

"Introduction to Optics", vol. 1, p. 123, published by Asakura-shoten, Japan.

*Primary Examiner*—John K. Corbin
*Assistant Examiner*—Ronald M. Kachmarik
*Attorney, Agent, or Firm*—Wenderoth, Lind & Ponack

[57] ABSTRACT

A selective shading device has a number of shading plates or planar members and a supporting body that holds the plates or planar members in such a manner that they are arrranged radially with respect to an optical axis. The device blocks sagittal bundles of rays. A preferred example of the supporting body is a cylindrical frame that holds the shading plates perpendicularly to the inner surface thereof. Alternatively, the shading planar members are formed within a lens element along the edge thereof.

36 Claims, 8 Drawing Sheets

SELECTIVE SHADING DEVICE AND AN OPTICAL DEVICE USING THE SAME

BACKGROUND OF THE INVENTION

1. Field of the Invention

The present invention relates to a shading device for use in an optical system and also to an optical device equiped with the shading device. More specifically, the invention relates to a shading device for blocking only sagittal rays and also to an optical device equipped with the shading device.

2. Description of the Prior Art

One means conventionally adopted to remedy aberrations of a lens is to place a stop having a circular or substantially circular hole in a plane perpendicular to the optical axis of the lens, the center of the stop being located on the optical axis (for example, see "Introduction to Optics", Vol. 1, p. 123, published by Asakura-shoten, Japan).

Many kinds of lenses including Gaussian lenses exhibit very large sagittal ray aberration. In order to reduce the aberration, a circular stop has been inserted in the optical axis to reduce the aperture, for blocking sagittal rays. However, this stop has the disadvantage that the reduction in the aperture results in a corresponding amount of axial and meridional rays being blocked.

SUMMARY OF THE INVENTION

It is an object of the present invention to provide a shading device capable of blocking only sagittal rays.

It is another object of the invention to provide an optical device equipped with the shading device described above.

The shading device according to the invention has a plurality of shading planar members extending in meridional planes containing an optical axis.

Generally, off-axis sagittal rays intersect the plane which is vertical to a meridional plane and contains the optical axis. Accordingly, any shading plane substantially perpendicular to the meridional plane stops sagittal rays, while meridional rays travel in a direction extending along the meridional plane. Therefore, any shading plane lying close to the meridional plane is substantially parallel to the meridional plane, and does not block meridional rays. Skewed rays other than meridional and sagittal rays are blocked in larger amounts as they more closely approximate sagittal rays, and are allowed to pass by a larger amount as they more closely approximate meridional rays. In this way, only sagittal rays and rays close to sagittal rays can be blocked.

The shading planar members can be comprised of a plurality of thin plates (shading plates) held by a supporting means. Alternatively, the shading planar members can be formed within a transparent solid body. The shading plates or planar members are formed integrally with a lens to form an optical device that can block only sagittal rays.

The above and other objects and features of the invention will become more apparent from the following description of the preferred embodiments taken in connection with the accompanying drawings.

DESCRIPTION OF THE PREFERRED EMBODIMENTS

Figure 1:
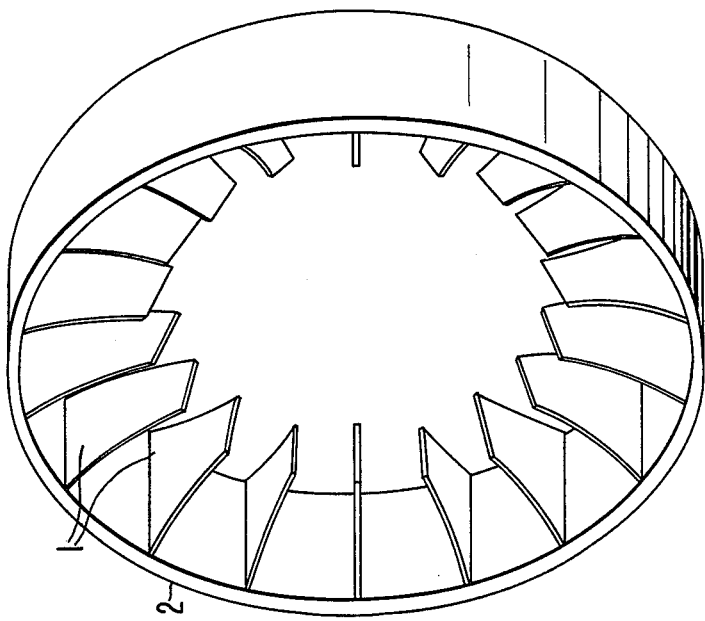
FIG. 1 is a perspective view showing an embodiment of a shading device according to the present invention.

Referring to FIG. 1, there is shown a shading device embodying the concept of the present invention. This device has a plurality of thin opaque plates 1 (shading plates, hereinafter). The shading plates 1 are held by a cylindrical supporting frame 2, and are angularly equally spaced from one another and extend in a vertical direction relative to the cylindrical inner surface of the supporting frame 2. That is, the shading plates 1 are arranged on meridional planes containing an optical axis, or the center axis of the frame 2. The surfaces of the plates 1 and the inner surface of the frame 2 are colored black, for example, for absorbing light to prevent the incident light from being reflected therefrom. The shading device shown in FIG. 1 has 18 shading plates 1.

Figure 2:
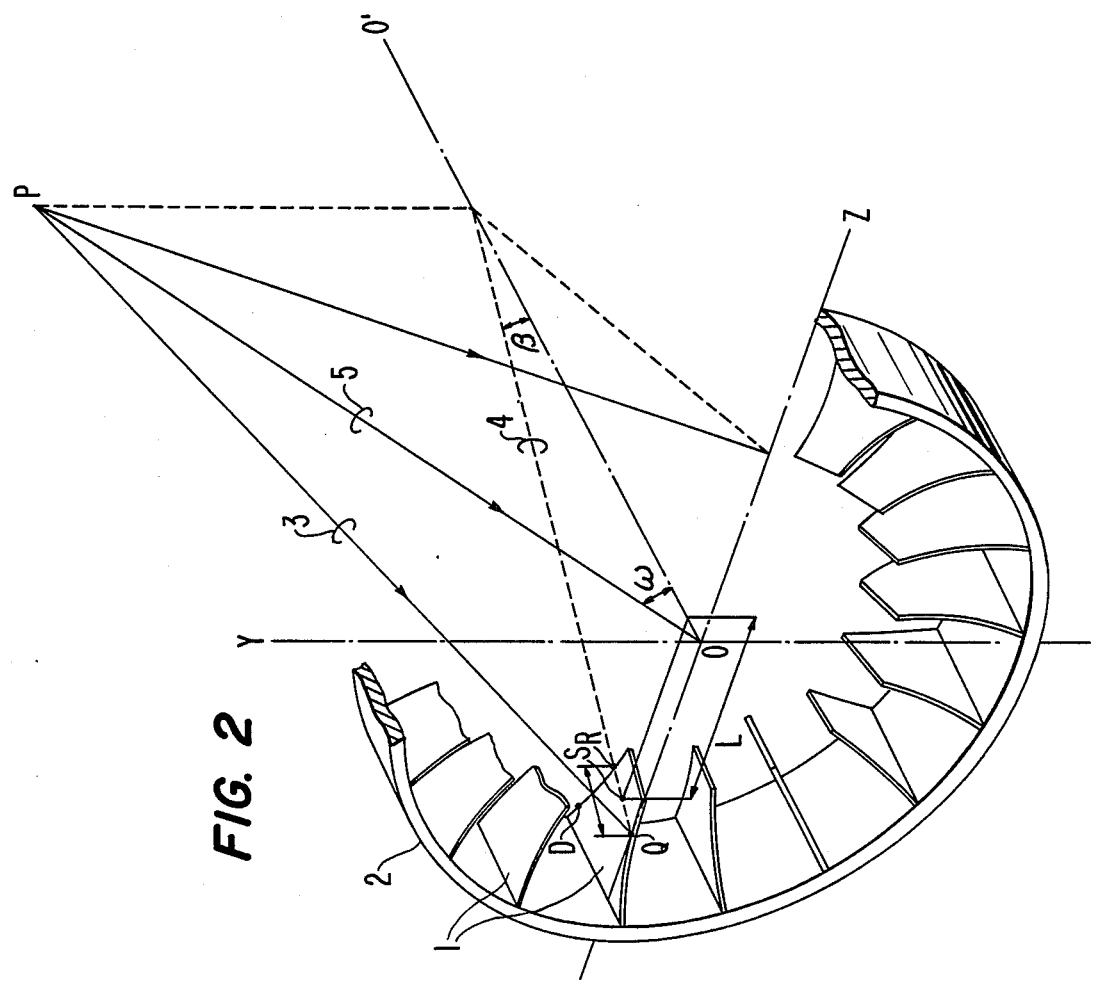
FIG. 2 is a diagram showing a relation of the shading device shown in FIG. 1 to sagittal rays.

The relation of the shading device shown in FIG. 1 to off-axis sagittal rays will next be described by referring to FIG. 2, where the meridional plane is indicated by plane YOO'. Plane ZOO' is perpendicular to the meridional plane and contains the optical axis OO'. A straight line 4 is an image obtained by projecting a sagittal ray 3 onto the plane ZOO'.

Consider the case in which one of the shading plates 1 lies on the plane ZOO'. The projected image 4 intersects the front and rear edges of the shading plate at points Q and R, respectively. The distance between the points Q and R is indicated by D. The midpoint S of the line segment QR lies on the projected image 4. The line segment normal to the optical axis OO' and intersecting the midpoint S has a length of L (hereinafter referred to as "average distance"). The projected image 4 makes an angle of ' with the optical axis OO'. The principal ray 5 makes an angle of ' with the optical axis OO'. The number of shading plates 1 is N. For every blocked sagittal ray, the values of D, β, ω, L, N are determined to satisfy the following relationship:

$$D \cos \beta \tan \omega \geq L \sin (2\pi/N) \quad (1)$$

The shading device designed as described above operates in the manner described below. An axial bundle of rays is blocked by the plate 1 by an amount corresponding to the area of the cross section of the plate 1, but the reduction in the amount of light is small because the plate 1 is thin. Similarly, a bundle of off-axis meridional rays is blocked by the plate 1 also by an amount corresponding to the area of the cross section of the plate 1. Also in this case, the reduction in the amount of light is small.

Neighboring shading plates make an angle of $2\pi/N$ (radians) with each other. The average interval between the neighboring shading plates which is taken at the positions where sagittal rays intersect the plates is approximately $L \sin(2\pi/N)$. The length of the projected image 4 which is taken along the optical axis is $D \cos'$. The sagittal ray 3 travels a distance of $D \cos \beta \tan \omega$ in a radial direction while it passes across the shading device. Accordingly, if the distance travelled by the sagittal ray in a radial direction is equal to or greater than the average interval between the shading plates 1, i.e., $D \cos \beta \tan \omega \geq L \sin(2\pi/N)$, then the sagittal ray is blocked.

The blocked sagittal bundle is a set of sagittal rays as mentioned above. Usually, sagittal bundles of various field angles are stopped. Thus, the above relation (1) is fulfilled for every blocked sagittal ray under the condition that $\beta$, $\omega$, L are variables.

It is not necessarily required to equally space the shading plates 1 from one another angularly. Let $\alpha$ be the angle that the neighboring shading plates make with each other. For the sagittal ray that satisfies the relations $\beta = \beta_1$, $\omega = \omega_1$, and $L = L_1$, the distance D and the angle $\alpha$ are determined to satisfy the following relation:

$$D \cos \beta_1 \tan \omega_1 \geq L_1 \sin \alpha \qquad (2)$$

Then, the same effects will be produced as obtained where the shading plates 1 are spaced from one another regularly. That is, for a certain sagittal ray, if the value of $D/\sin \alpha$ is the same, the same effects are produced.

Figure 3:
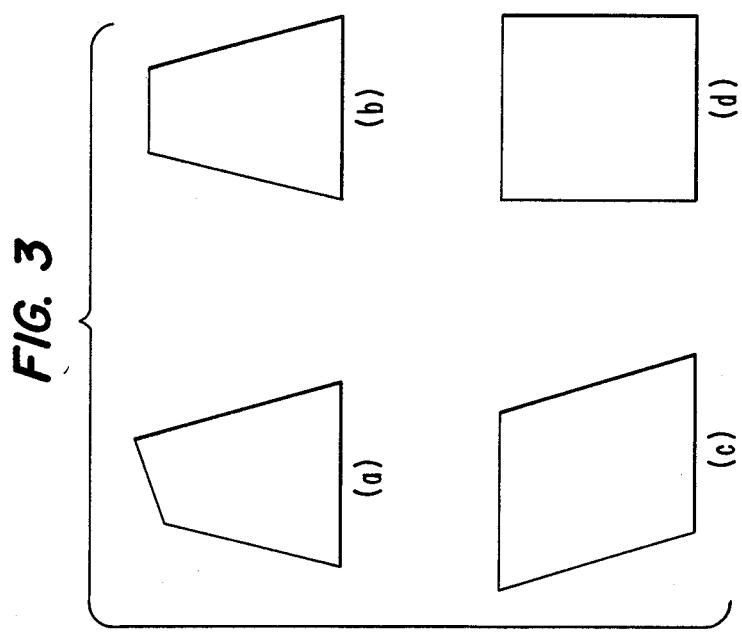
FIG. 3 shows various shapes that a shading plate according to the present invention can take.

Any shape other than that shown in FIG. 1 can be employed for the shading plate as long as it can satisfy the aforementioned relation. For example, as shown in FIG. 3, the shape can be a quadrangle (a), trapezoid (B), parallelogram (c), or rectangle (d). However, as the difference between both sides of the above relational formula becomes larger, more rays which are not required to be blocked are stopped.

Figure 4B:
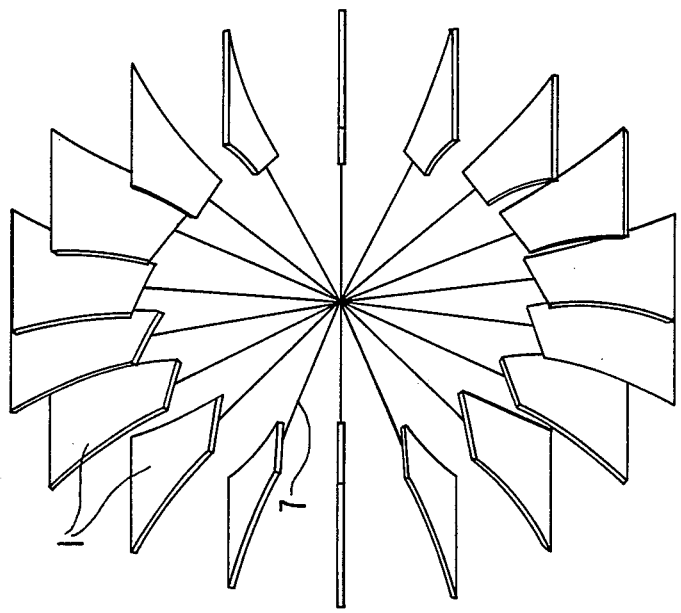
FIGS. 4(a)–4(d) are perspective views of other embodiments of a shading device according to the invention.
Figure 4A:
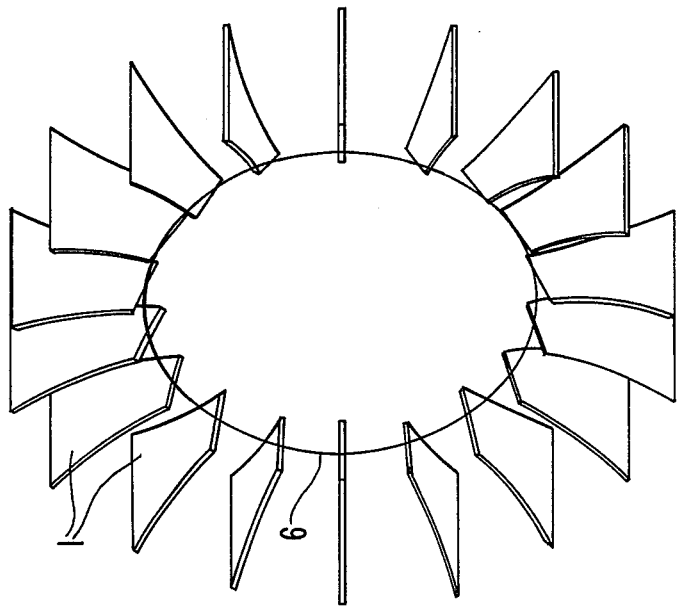
Figure 4C:
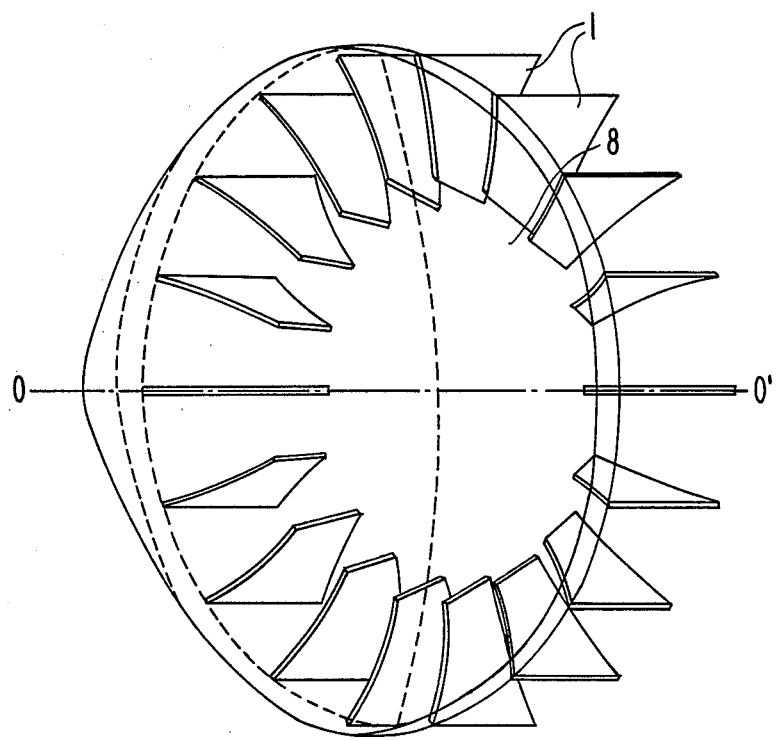
Figure 4D:
Figure 4E:
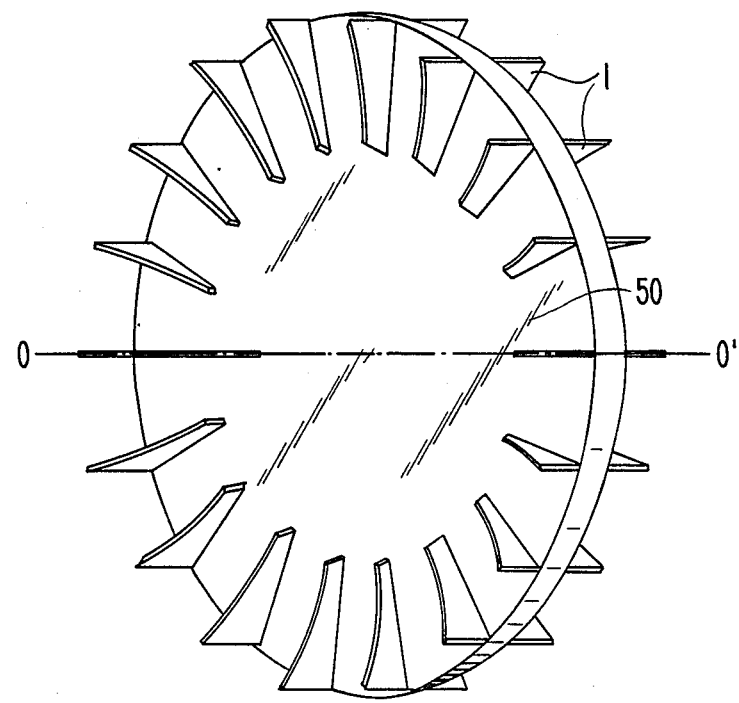

The shape of the supporting means for holding the shading plates 1 is not limited to the shape shown in FIG. 1. For instance, it may be a truncated cone. Also, the supporting frame 2 may be replaced by a supporting ring 6 as shown in FIG. 4(a) or radial supporting spokes 7 as shown in FIG. 4(b). Furthermore, the supporting means may be another optical element such as a lens 8 as shown in FIG. 4(c), where the optical axis is indicated by O-O'. Furthermore, the shading plats 1 may be held circumferentially on at least one transparent plate 50 extending perpendicular to the optical axis O—O' as shown in FIG. 4(d).

As described above, the shading device according to the invention does not block off-axis meridional bundles of rays, but stops sagittal bundles of rays. By replacing the conventional stop arranged to block off-axis sagittal bundles of rays with the novel shading device, those meridional bundles of rays which heretofore would have been blocked are allowed to pass through an optical element, such as a lens. This makes the optical element remarkably brighter.

Figure 5:
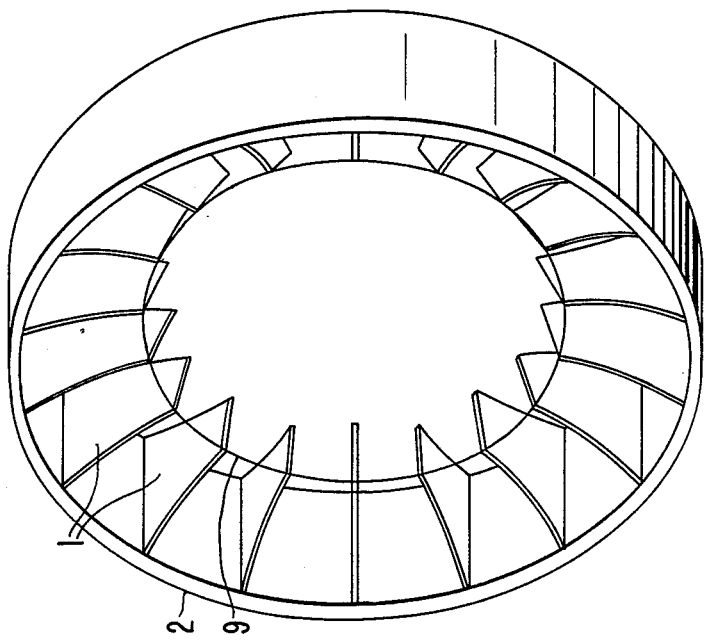
FIG. 5 is a perspective view of a further embodiment of a shading device according to the invention.

Referring next to FIG. 5, there is shown another embodiment of a shading device according to the invention. This device comprises a plurality of shading plates 1 held by a cylindrical supporting frame 2 and a reinforcing ring 9 that supports inner ends of the plates 1. The parameters that determine the shape of each of the shading plates 1 are illustrated in FIG. 2 in the same manner as the shading device already described in conjuction with FIG. 1. For every blocked sagittal ray, the parameters D, $\beta$, $\omega$, L, and N are determined to satisfy the above-described relation (1). The shading device constructed in this way operates in the same manner as the shading device described above.

It is desirable to make the shading plates 1 as thin as possible so that fewer axial bundles of rays are blocked. However, if they are too thin, they will bend or twist, resulting in an equivalent increase in cross-sectional area. Therefore, each shading plate is reinforced by at least one ring 9 to minimize the bend or twist. Hence, ideal shading plates can be achieved.

Figure 6:
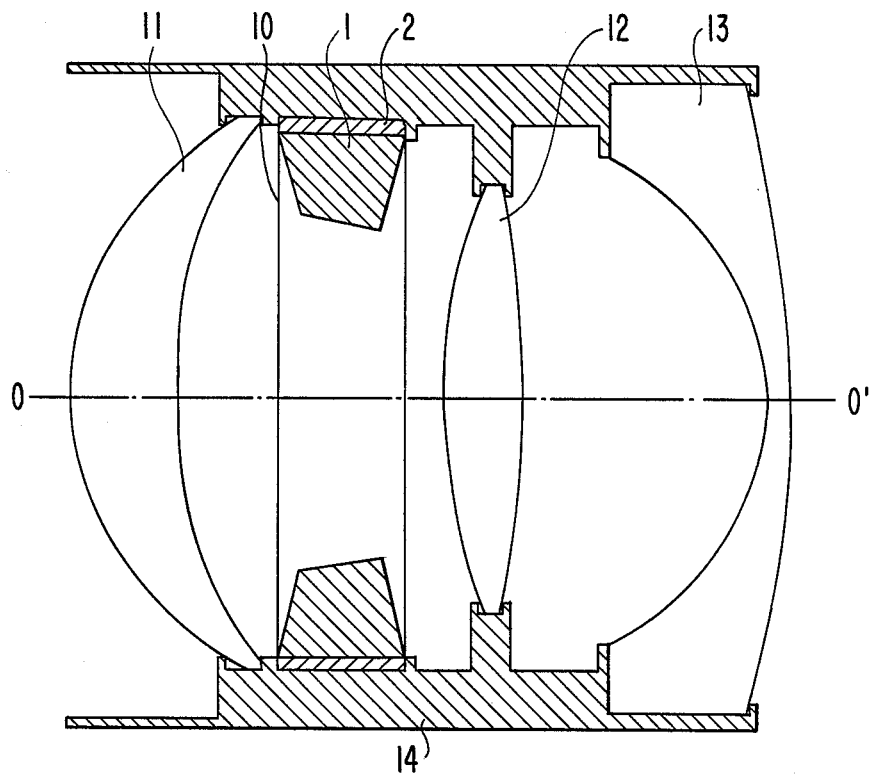
FIG. 6 is a cross-sectional view of a projection lens for use in a projection television set, the lens incorporating the shading device shown in FIG. 1.

An optical device incorporating a shading device according to the invention will next be described. Referring to FIG. 6, there is shown a projection lens for use in a projection television set, incorporating the shading device shown in FIG. 1. It is now assumed that the projection lens exhibits large aberrations for off-axis sagittal marginal rays. The shading device shown in FIG. 1 is indicated by numeral 10 in FIG. 6. The projection lens consists of lens elements 11, 12 and 13 which are held inside a lens barrel 14. Preferably, the shading device 10 is located in a position at which the principal ray of the blocked sagittal bundle of rays intersects the optical axis O—O'.

Figure 7A:
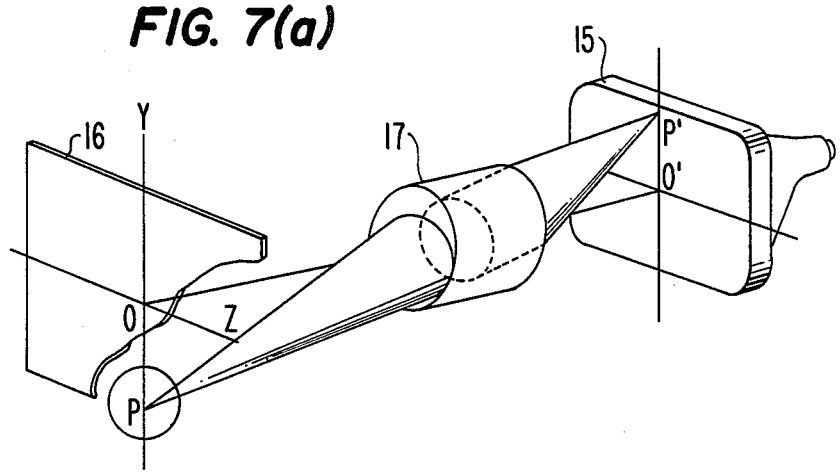
FIGS. 7(a)–7(c) illustrate the principle on which a shading device according to the invention operates in a projection television set, as well as the effects of the device.
Figure 7B:
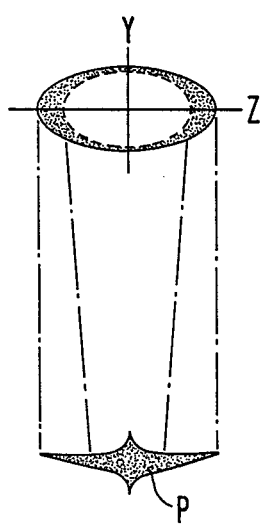
Figure 7C:
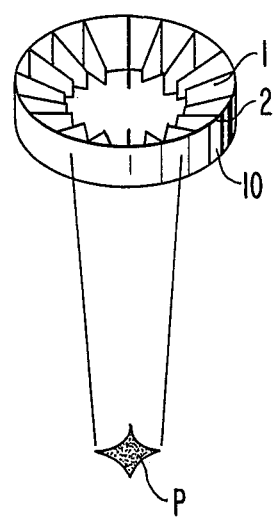

The operation of the optical device incorporating the shading device as shown in FIG. 6 will now be described. First, the principle of operation of the projection television set will be described by referring to FIG. 7(a), where a cathode-ray tube (CRT) 15, a screen 16, and a projection lens 17 are shown. A point light source P' on the CRT 15 is projected on the screen 16, forming an image P. The projected image P which is obtained when the shading device is not present is shown in FIG. 7(b). Because of off-axis sagittal marginal rays and skew rays near these sagittal marginal rays, both of which are indicated by the dotted areas, the projected image P is tailed in the sagittal directions. The projected image P which is obtained when the shading device is employed is shown in FIG. 7(c), in which the off-axis sagittal marginal rays and the skew rays near these sagittal marginal rays are blocked. The projected image P forms a point image in which the sagittal and meridional aberrations are well balanced. Axial bundles of rays and off-axis meridional bundles of rays are not blocked substantially. As described thus far, in the present invention, the image quality can be remarkably enhanced without greatly impairing the brightness of the lens. While the projection lens for use in the projection television set is constituted by the present invention, the invention is also applicable to all optical systems, including a camera, in which a lens gives rise to large sagittal ray aberration.

Figure 8A:
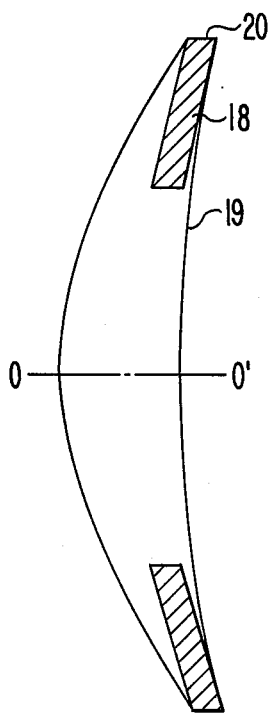
FIG. 8 is a perspective view of an optical element comprising a lens in which shading planes are formed.
Figure 8B:
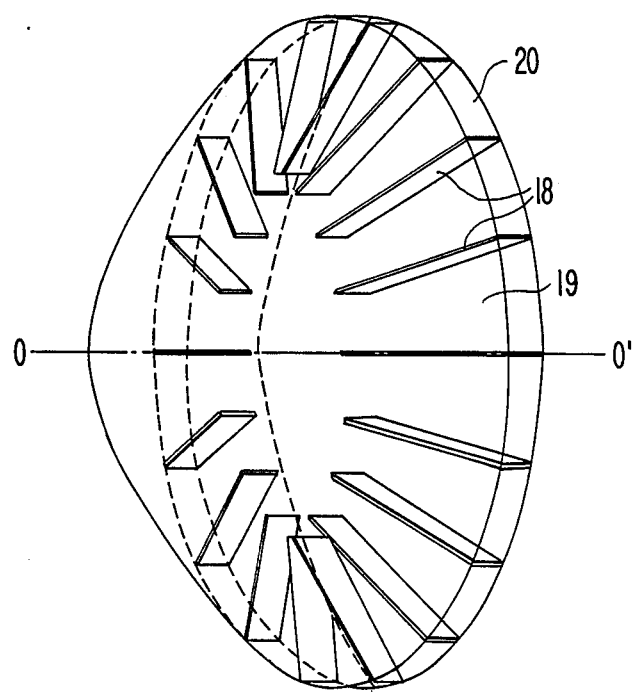

An optical device comprising a lens in which shading planar members according to the invention are formed will be described below. Referring to FIG. 8, there is shown a lens 19 which is similar in shape to the projection lens 11 shown in FIG. 6. The shading device 10 shown in FIG. 6 is unnecessary in this example. A plurality of shading planar members 18 are formed in the lens 19. The shading planar members are extend along meridional planes, and are equally angularly spaced from one another about the optical axis O—O' of the lens 19, the edge of which is indicated by numeral 20. The shading planes 18 are blacked or otherwise colored to absorb light, for preventing the reflection of the incident light therefrom. As an example, the lens 19 is made from a plastic, and is notched at the edge 20. Then, a black paint is injected into the produced notches. In the example shown in FIG. 8, the number of shading planar members 18 is eighteen. The parameters that determine the shape of the shading planar members 18 are illustrated in FIG. 2 in the same manner as in the case of the first-mentioned embodiment. For every blocked sagittal ray, the parameters D, $\beta$, $\omega$, L, N are determined to satisfy the previously described relation (1).

The shading planar members 18 designed as described above operate in the same manner as the shading plates 1 shown in FIG. 1. It is not required that the shading planar members 18 be equally angularly spaced from one another. Let $\alpha$ be the angle that neighboring shading planar members 18 make with each other. For the sagittal ray conforming to the relations $\beta=\beta_1$, $\omega=\omega_1$, and $L=L_1$, the values of D and $\alpha$ are determined to satisfy the previously described relation (2). Thus, the same effects will be produced as obtained when the shading planar members equally angularly spaced from one another.

The shading planar members 18 may have any other shape than the one shown in FIG. 8, as long as the aforementioned relationship is satisfied. For example, as shown in FIG. 3, the shading members may be a quadrangle (a), trapezoid (b), parallelogram (c), or rectangle (d), in the same fashion as the first embodiment. Note that if the difference between both sides of the formula becomes larger, then more rays which need not be blocked are stopped.

As described thus far, the FIG. 8 embodiment constitutes an optical device comprising a lens in which shading planar members for blocking sagittal rays and for passing meridional rays are formed. Axial bundles of rays and meridional bundles of rays which heretofore would have been blocked are permitted to pass through the optical device. Consequently, the optical device is rendered remarkably brighter than the prior art device.

A shading device having movable means and fabricated in accordance with the invention will next be described.

Figure 9A:
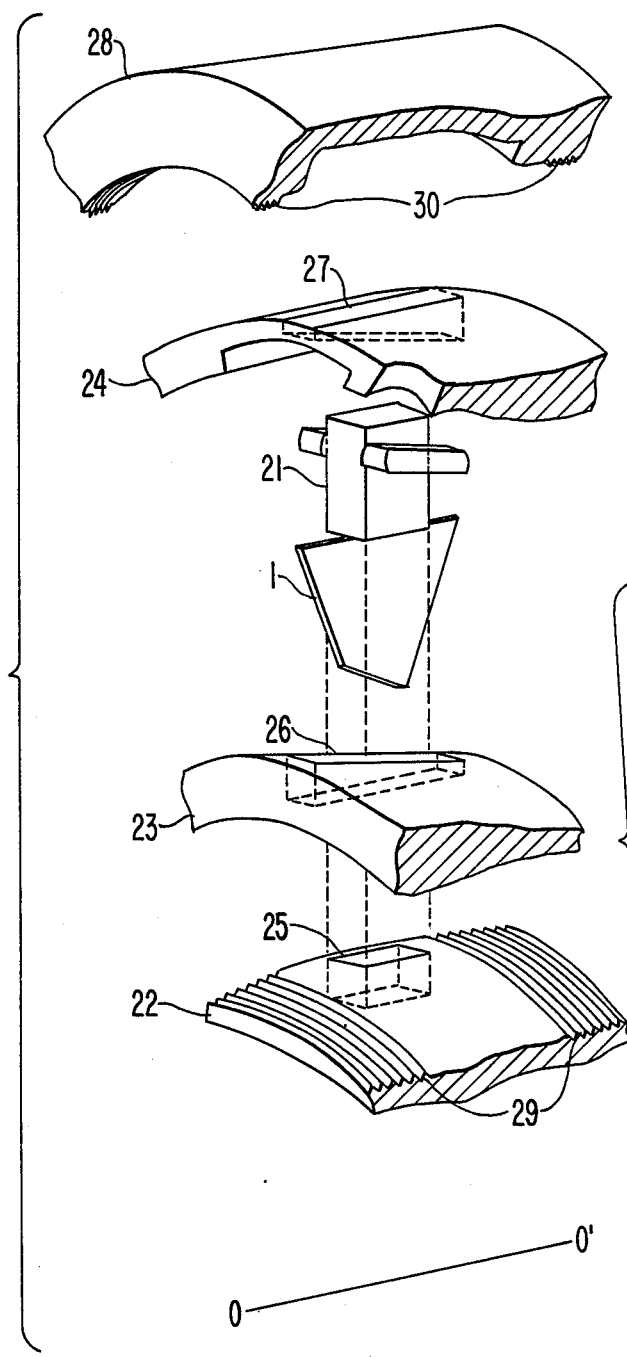
FIG. 9 is an exploded perspective view of a driving mechanism of still another embodiment of a shading device equipped with movable means according to the present invention.
Figure 9B:
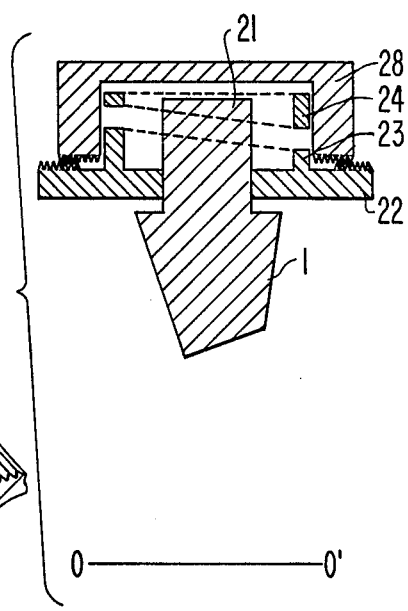

Referring to FIG. 9, there is shown a structure of a driving mechanism according to the invention. The mechanism has a guide 21 that is integral with a shading plate 1. The mechanism further has a fixed supporting frame 22, an inner movable supporting frame 23, and an outer movable supporting frame 24. The supporting frames 23 and 24 are fixed to each other. The fixed supporting frame 22 is provided with a groove 25 for guiding the shading plate 1. The supporting frames 23 and 24 are provided with grooves 26 and 27, respectively, which are surrounded by vertical flat walls, to guide the shading plate 1. The movable frames 23 and 24 are held in a movable ring 28. The fixed frame 22 has threaded portions 29. The movable ring 28 has tapped portions 30. The supporting frames 22, 23, 24 and the movable ring 28 are all cylindrical in shape, but only the portions which correspond to one shading plate are shown in FIG. 9 for simplicity.

The outer surface of the inner movable supporting frame 23 and the inner surface of the outer movable supporting frame 24 form a guide groove that is at an angle to the center axis, or the optical axis O-O'. When the ring 28 is rotated, it moves to and fro, insomuch as its tapped portions 30 are in mesh with the threaded portions 29. At this time, the movable supporting frames 23 and 24 move to and fro along the optical axis while guided by the fixed supporting frame 22. As a result, the shading plate 1 is moved up and down. A guide hole 25 formed in the fixed supporting frame 22 acts to restrict the movement of the shading plate to vertical movement. The hole 25 also serves to retain the plate 1 in a way in which the plate extends radially with respect to the center.

Figure 10:
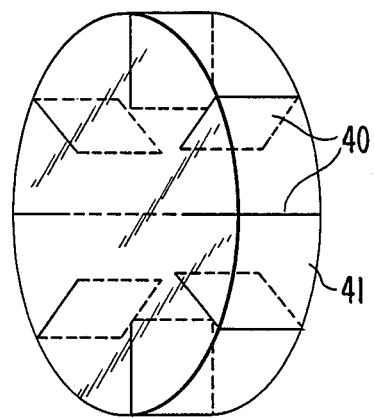
FIG. 10 is a perspective view of yet another embodiment of a shading device according to the invention.
Figure 11A:
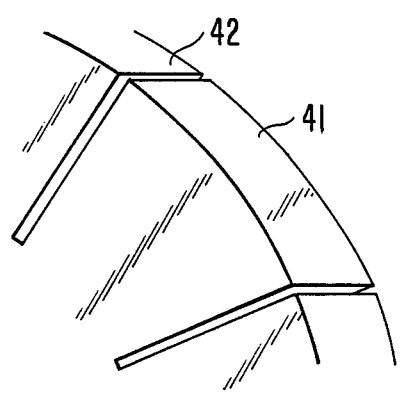
FIGS. 11(a) and 11(b) are fragmentary perspective views of the shading device shown in FIG. 10, showing manners in which the device is fabricated.
Figure 11B:
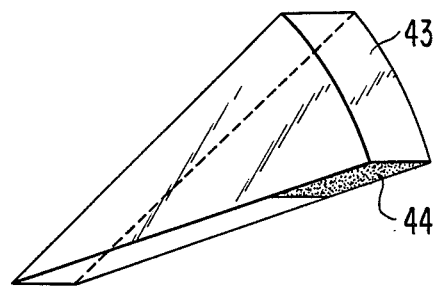

Referring to FIG. 10, there is shown a still another shading device according to the invention. This device comprises a transparent body 41 in which a plurality of shading planar members 40 are formed. The transparent body 41 is made of glass or plastic. The shading planar members 40 are arranged in the same manner as the shading planar members already described. The shading device shown in FIG. 10 has a advantage in that the shading planar members 40 can be made quite thin. As shown in FIG. 11(a), slits 42 are formed at the periphery of the transparent body 41, and then a light-blocking paint is injected into the slits to form the shading planar members 40. Alternatively, as shown in FIG. 11(b), transparent elements 43 (only one is shown) each having a light-blocking coating 44 at least on a part of its one side surface are stuck to each other in a side-by-side relation. Obviously, by shaping the transparent body 41 shown in FIG. 10 into a lenticular form, the optical device shown in FIG. 8 can be derived.

Although some embodiments have been described, various other changes and modifications can be made within the scope of the invention which is solely defined in the appended claims.

What is claimed is:

1. A selective optical shading device having an optical axis, and a plurality of shading members for blocking sagittal rays and rays close to sagittal rays of a light directed at the device, said shading members disposed radially with respect to the optical axis, and each of said shading members comprising a planar shape located in a respective one of meridional planes along which the optical axis extends, wherein for every blocked sagittal ray, the shading members are designed to satisfy the relation:

$$D \cos \beta \tan \omega \geqq L \sin \alpha$$

where $\omega$ is an angle that a principal ray makes with the optical axis; D is the portion of a sagittal ray that is cut by one of the shading members when the sagittal ray is projected on a plane which is vertical to the meridional plane and contains the optical axis; L is the average distance between said portion of the sagittal ray that is cut by one of the shading members and the optical axis; $\beta$ is an angle that said sagittal ray when projected makes with the optical axis; and $\alpha$ is an angle that adjacent ones of the meridional planes in which the shading members are located make with each other.

2. A selective shading device as set forth in claim 1, wherein the shading members are equally angularly spaced apart from one another by a distance extending in a direction around the optical axis and satisfy the relation:

$$\alpha = 2\pi/N$$

where N is the number of the shading members, and $\alpha$ is said distance.

3. A selective shading device as set forth in claim 1, wherein the shape of each of the shading members is a quadrangle.

4. A selective shading device as set forth in claim 1, wherein the shape of each of the shading members is a rectangle.

5. A selective shading device as set forth in claim 1, wherein the shape of each of the shading members is a trapezoid.

6. A selective shading device as set forth in claim 1, wherein the shape of each of the shading members is a parallelogram.

7. A selective shading device as set forth in claim 1, wherein the shading members are colored to absorb light.

8. A selective shading device having an optical axis, said device comprising:
a plurality of shading plates for blocking sagittal rays and rays close to sagittal rays of a light directed at the device, said shading plates disposed radially with respect to the optical axis, and each of said shading plates having a planar shape located in a respective one of meridional planes along which the optical axis extends; and
a supporting means for supporting said shading plates in position relative to one another, the supporting means comprising a supporting frame having a cylindrical inner surface on which each of the shading plates is supported perpendicular to the inner surface at respective first ends thereof.

9. A selective shading device as set forth in claim 8, further comprising a reinforcing ring that fixes another end of each of the shading plates.

10. A selective shading device as set forth in claim 8, and further comprising an optical element disposed in an optical relationship with said shading plates for forming an optical device.

11. A selective shading device comprising:
a base that transmits light, said base having an optical axis; and
a plurality of shading members for blocking sagittal rays and rays close to sagittal rays of light directed at the device, said shading members disposed radially with respect to the optical axis, and each of said shading members comprising a planar shape located in a respective one of meridional planes along which the optical axis extends, wherein for every blocked sagittal ray, the shading members satisfy the relation:

$$D \cos \beta \tan \omega \geqq L \sin \alpha$$

where $\omega$ is an angle that a principal ray makes with the optical axis; D is the portion of a sagittal ray that is cut by one of the shading members when the sagittal ray is projected on a plane which is vertical to the meridional plane and contains the optical axis; L is the average distance between said portion of the sagittal that is cut by one of the shading members and the optical axis; $\beta$ is an angle that said sagittal ray when projected makes with the optical axis; and $\alpha$ is an angle that adjacent ones of the meridional planes in which the shading members are located make with each other.

12. A selective shading device as set forth in claim 11, wherein the base is cylindrical.

13. A selective shading device as set forth in claim 11, wherein the base comprises a lens.

14. A selective shading device as set forth in claim 11, wherein the base has slits each of which extends in a respective one of said meridional planes, and said shading members comprise a medium that absorbs light and is disposed in said slits.

15. A selective shading device as set forth in claim 11, wherein the shading members are equally angularly spaced apart from one another by a distance extending in a direction around the optical axis and satisfy the relation:

$$\alpha = 2\pi/N$$

where N is the number of the shading members, and $\alpha$ is said distance.

16. A selective shading device as set forth in claim 11, wherein the shape of each of the shading members is a quadrangle.

17. A selective shading device as set forth in claim 11, wherein the shape of each of the shading members is a rectangle.

18. A selective shading device as set forth in claim 11, wherein the shape of each of the shading members is a trapezoid.

19. A selective shading device as set forth in claim 11, wherein the shape of each of the shading members is a parallelogram.

20. An optical device comprising:
an optical lens having an optical axis; and
a plurality of shading members for blocking sagittal rays and rays close to sagittal rays, said shading members disposed radially with respect to the optical axis, and each of said shading members comprising a planar shape located in a respective one of meridional planes along which the optical axis extends, wherein for every blocked sagittal ray, the shading members satisfy the relation:

$$D \cos \beta \tan \omega \geqq L \sin \alpha$$

where $\omega$ is an angle that a principal ray makes with the optical axis; D is the portion of a sagittal ray that is cut by one of the shading members when the sagittal ray is projected on a plane which is vertical to the meridional plane and contains the optical axis; L is the average distance between said portion of the sagittal that is cut by one of the shading members and the optical axis; $\alpha$ is an angle that said sagittal ray when projected makes with the optical axis; and $\alpha$ is an angle that adjacent ones of the meridional planes in which the shading members are located make with each other.

21. An optical device as set forth in claim 20, wherein the shading members are integral with the lens.

22. An optical device as set forth in claim 20, wherein the shading members comprise a plurality of shading plates, and further comprising a supporting means for supporting said plates radially with respect to the optical axis of the lens.

23. An optical device as set forth in claim 22, and further comprising a means for moving the shading plates with respect to the optical axis.

24. An optical device as set forth in claim 20, wherein the shading members are equally angularly spaced apart from one another by a distance extending in a direction around the optical axis and satisfy the relation:

$$\alpha = 2\pi/N$$

where N is the number of the shading members, and $\alpha$ is said distance.

25. An optical device as set forth in claim 20, wherein the shape of each of the shading members is a quadrangle.

26. An optical device as set forth in claim 20, wherein the shape of each of the shading members is a rectangle.

27. An optical device as set forth in claim 20, wherein the shape of each of the shading members is a trapezoid.

28. An optical device as set forth in claim 20, wherein the shape of each of the shading members is a parallelogram.

29. A selective shading device having an optical axis, said device comprising:
a plurality of shading plates for blocking sagittal rays and rays close to sagittal rays of a light directed at the device, said shading plates disposed radially with respect to the optical axis, and each of said shading plates having a planar shape located in a respective one of meridional planes along which the optical axis extends;
a supporting means for supporting said shading plates in position relative to one another; and
means for moving the shading plates relative to the optical axis.

30. A selective shading device as set forth in claim 29, wherein the supporting means comprises at least one transparent plate extending perpendicular to the optical axis.

31. A selective shading devices as set forth in claim 29, wherein the shading plates are equally angularly spaced apart from one another by a distance extending in a direction around the optical axis and satisfy the relation:

$$\alpha = 2\pi/N$$

where N is the number of the shading plates, and $\alpha$ is said distance.

32. A selective shading device as set forth in claim 29, wherein the shape of each of the shading plates is a quadrangle.

33. A selective shading device as set forth in claim 29, wherein the shape of each of the shading plates is a rectangle.

34. A selective shading device as set forth in claim 29, wherein the shape of each of the shading plates is a trapezoid.

35. A selective shading device as set forth in claim 29, wherein the shape of each of the shading plates is a parallelogram.

36. A selective shading device having an optical axis, said device comprising:
a plurality of shading plates for blocking sagittal rays and rays close to sagittal rays of a light directed at the device, said shading plates disposed radially with respect to the optical axis, and each of said shading plates having a planar shape located in a respective one of meridional planes along which the optical axis extends; and
a supporting means for supporting said shading plates in position relative to one another, and wherein the shading plates satisfy the relation:

$$D \cos \beta \tan \omega \geq L \sin \alpha$$

where $\omega$ is an angle that a principal ray makes with the optical axis; D is the portion of a sagittal ray that is cut by one of the shading plates when the sagittal ray is projected on a plane which is vertical to the meridional plane and contains the optical axis; L is the average distance between said portion of the sagittal that is cut by one of the shading plates and the optical axis; $\alpha$ is an angle that said sagittal ray when projected makes with the optical axis; and $\alpha$ is an angle that adjacent ones of the meridional planes in which the shading plates are located make with each other.

* * * * *